May 12, 1942.
O. C. MARTIN
2,282,490
VALVE CONSTRUCTION
Filed June 4, 1940
2 Sheets-Sheet 1
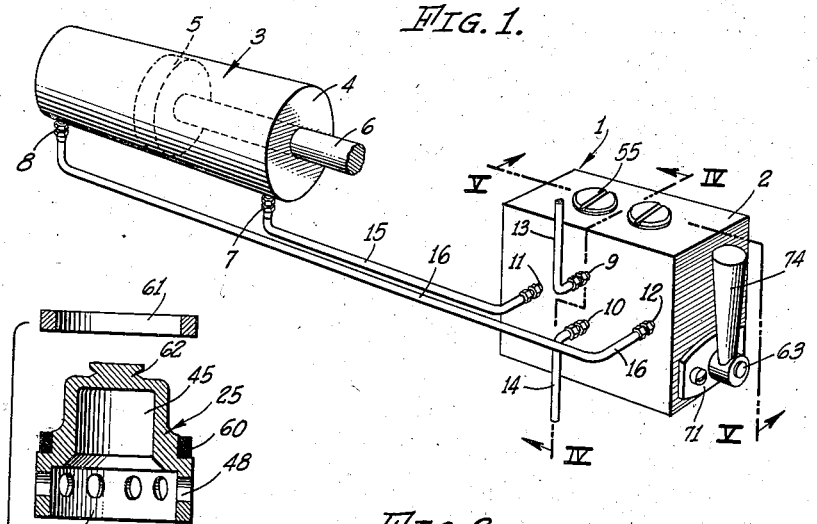
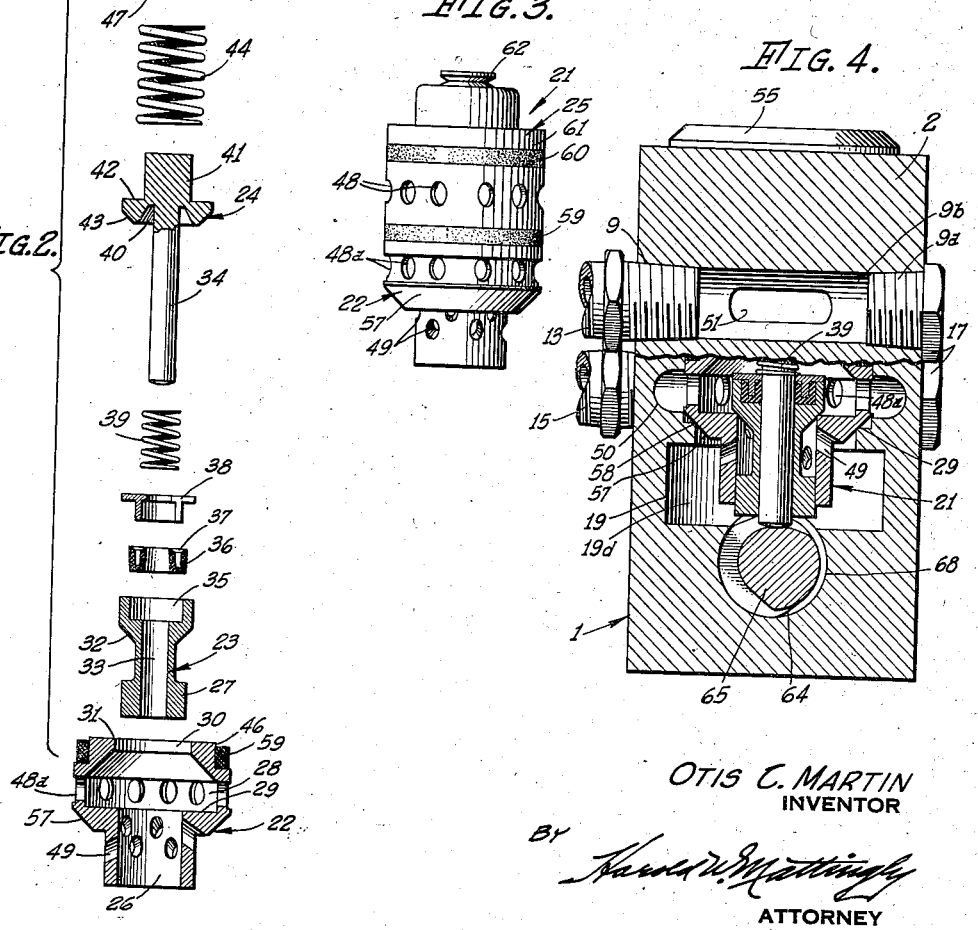
OTIS C. MARTIN
INVENTOR
BY
*Harold W. Mattingly*
ATTORNEY May 12, 1942.    O. C. MARTIN    2,282,490
VALVE CONSTRUCTION
Filed June 4, 1940    2 Sheets-Sheet 2

OTIS C. MARTIN,
INVENTOR

By Harold W. Mattingly
ATTORNEY

Patented May 12, 1942

2,282,490

UNITED STATES PATENT OFFICE 2,282,490

VALVE CONSTRUCTION

Otis C. Martin, Los Angeles, Calif.

Application June 4, 1940, Serial No. 338,727

1 Claim. (Cl. 277—20)

My invention relates to valves and has particular reference to a valve construction particularly adapted for controlling hydraulic or pneumatic pressure.

In connection with fluid power operated apparatus, the types of valves which have been used heretofore have been for the most part heavy cumbersome constructions which have required complete disconnection and removal of the valves from the lines in order to make repairs or adjustments of the various valve parts. This objection is particularly obnoxious in industries in which loss of time in making repairs is of extreme importance; for example, in the valves used for controlling hydraulically or pneumatically various functions of an airplane, the necessity for quick repairs is urgent and in prior types of valves used for this purpose it was necessary to completely remove the valves and either substitute an entire valve or delay placing the plane back into operation until the original valve had been repaired and reinstalled.

In my copending application Serial No. 323,376, I have described and claimed a new type of valve which is characterized by its compactness and ease of original manufacture and the ease with which the same may be connected to or disconnected from the flow lines in making repairs and replacements. However, while the valve described in that application solves a number of the problems relating to weight and space requirements, it is primary object of the present invention to provide an extremely simple valve construction which will facilitate the making of repairs to valves without requiring the removal or disconnection of the valves from the flow lines.

Another object of my invention is to provide a valve construction which is adapted for any hydraulic or pneumatic power use and in which the valve member and valve seat may be assembled together as a single removable and replaceable unit, thus facilitating repairs to the valves merely by the removal of one unit and replacement thereof by a new or reconditioned unit.

Another object of my invention is to provide a construction as set forth in the preceding paragraph in which the valve unit is particularly adapted for three-way valve operations and in which the valve unit includes two valve seats and two independently operable valve members, the unit being bodily removable and replaceable within the valve body which may be permanently connected to the flow lines.

Another object of my invention is to provide a valve construction particularly adapted for reversible fluid power machinery, in which a pair of double valve units may be assembled together in a single valve body so as to provide for controlling the supply of fluid power in either direction of flow lines leading to the fluid operated mechanisms.

Other objects and advantages of my invention will be apparent from a study of the following specifications, read in connection with the accompanying drawings, wherein Fig. 1 is a perspective view of a valve constructed in accordance with my invention and illustrated diagrammatically as being connected to a two-way piston and cylinder fluid power apparatus;

Fig. 2 is an exploded view of a valve unit assembly constructed in accordance with my invention;

Fig. 3 is a detail elevational view of an assembled valve unit shown in Fig. 2;

Fig. 4 is a transverse vertical sectional view of the valve construction illustrated in Fig. 1, the view being taken along line IV—IV of Fig. 1;

Figure 5:
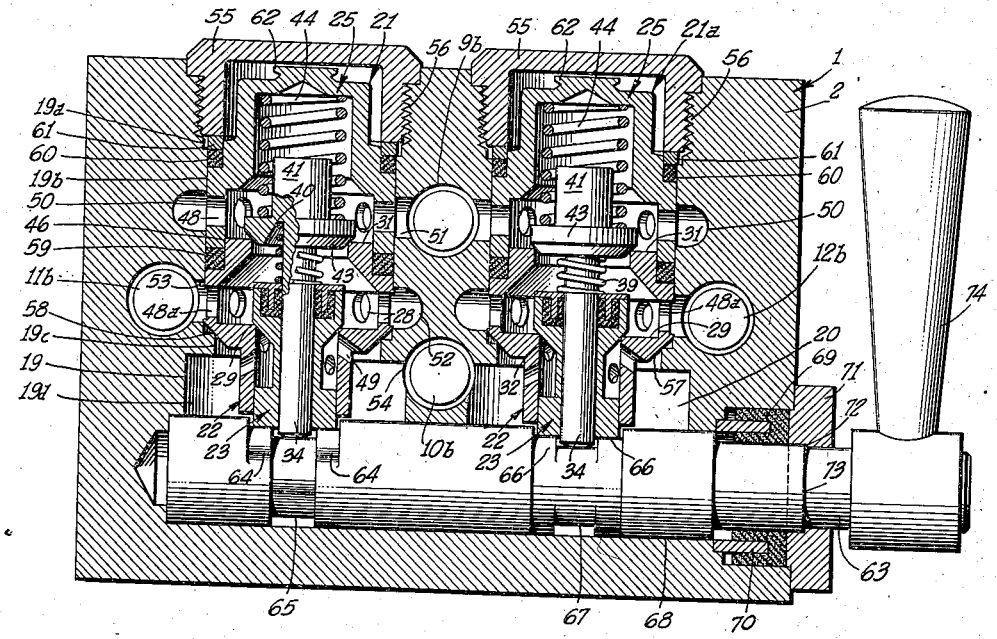
Fig. 5 is a vertical sectional view taken through the valve illustrated in Fig. 1, the section being taken along the line V—V of Fig. 1, and illustrating the valve parts in closed position.

Referring to the drawings, I have illustrated in Fig. 1 a valve 1 constructed in accordance with my invention, such valve including a body member or block 2 which may be and is preferably constructed from a single block of suitable material, either metal or plastic material, though for the purpose of permitting my valve to control pressures of several hundreds of pounds and yet be extremely light in weight I prefer to form the body block 2 from a single piece of aluminum alloy such as "duralumin."

The particular form of valve illustrated in Fig. 1 is one which is adapted to control reversible power apparatus such as a piston and cylinder mechanism 3, selected merely for the purposes of illustration as including a cylinder 4, within which reciprocates a piston 5 coupled to whatever device is to be operated thereby by means of a piston rod 6. At one end of the cylinder 4 is a fluid inlet 7 while at the opposite end there is a fluid inlet 8 so that by supplying fluid under pressure to the inlet 7 the piston 5 will move from the right-hand end of the cylinder 4, as viewed in Fig. 1, toward the left-hand end, exhaust fluid from the left-hand side of the piston 5 being passed out through the fluid inlet (outlet) 8. By supplying fluid pressure through the fluid inlet 8 and exhaust fluid through the inlet (outlet) 7, the piston 5 will be moved in the opposite direction. This form of valve illustrated in Fig. 1 has been selected for the purpose of presenting the most comprehensive view of my improved valve construction but, as will be pointed out hereinafter, the principles of the invention are equally adapted to either single or multiple valves to be used for various other types of installations.

With the form of valve illustrated in Fig. 1, the valve body block 2 is provided with a plurality of ports 9, 10, 11 and 12, respectively, to which may be connected the various pipe lines required for the operation of the system; for example, the port 9 may be coupled to a supply pipe 13 leading from a suitable tank or other source of fluid under pressure while the port 10 may be coupled by a suitable pipe 14 as a return line to the tank or as an exhaust line exhausting to the atmosphere. The port 11 may be connected by a suitable pipe 15 to the inlet 7 for the cylinder 4 while the port 12 may be connected with the fluid inlet 8 of the cylinder 4 by means of a pipe 16.

Referring particularly to Fig. 4, it will be observed that my valve is readily adaptable for mounting in a number of different positions which will readily permit the connection of the various pipe lines to either one side or the other side of the valve body block 2 by forming the ports 9, 10, 11 and 12 on one side of the body block 2 and by forming corresponding ports on the opposite side of the body block, one pair of such ports being illustrated in Fig. 4 as including the supply port 9 to which the pipe line 13 is connected while a similar and corresponding port 9a is formed in the opposite side of the body block 2 with a laterally extending fluid passage 9b interconnecting the ports 9 and 9a. Thus the pipe line 13 may be connected to the left-hand side of the valve body if that is the most convenient side to obtain access to and the port 9a may be plugged with a suitable threaded plug 17. If, on the other hand, the right-hand side of the valve body 2 is easiest of access, then the pipe 13 may be coupled by means of any suitable coupling 18 to the port 9a and the plug 17 may be used to fill the port 9.

It will be understood that laterally extending bores or fluid passages 10b, 11b and 12b (see Fig. 5) extend laterally through the valve body 2 so as to permit access for the pipes 14, 15 and 16 to either side of the valve body in the same manner as was described for the port 9 and pipe 13.

When my valve is to be employed with a power apparatus such as 3, I prefer to provide in the valve block 2 a pair of valve chamber bores 19 and 20, respectively, such valve bores extending in parallel relation to each other and disposed side by side in the same vertical plane. The valve bore 19 preferably extends from the top surface of the valve body 2 and is disposed between the fluid passage 11b on the one hand and the fluid passages 9b and 10b on the other hand, while the valve bore 20 similarly extends from the top surface of the valve body 2 and is disposed between the fluid passage 12b on the one hand and the fluid passages 9b and 10b on the other hand. Thus the fluid passages 9b and 10b are common to both of the valve bores.

The valve bore 19 may be readily formed by any suitable machining operation, such as by drilling from the top surface of the valve body and so forming the bore as to provide a bore, the upper portion 19a of which is of greater diameter than the portion 19b immediately below it while an inwardly projecting flange 19c is provided near the lower end of the bore and then an enlargement 19d of the bore is formed at its extreme lower end. This latter enlargement may be formed as illustrated and described in my copending application Serial No. 330,752, as by running a suitable boring tool into and through the smaller portions 19a and 19b, and using this tool to cut or enlarge the bore as indicated at 19d.

The bore 19 intercommunicates between the pressure inlet passage 9b, the fluid passage 11b and the exhaust fluid passage 10b so that by inserting in the bore 19b a suitable valve assembly, such valve assembly will act as one or more partitions dividing the bore 19 and preventing passage of fluid from the passage 19b to the passage 11b except through a controllable valve, and likewise preventing the passage of fluid from the passage 11b to the exhaust passage 10b except through a controllable valve.

The portion of the bore 19b provides a chamber into which may be received my novel valve assembly unit indicated at 21 as comprising a seat member 22, a sleeve valve member 23, a poppet valve member 24, a cap member 25 and suitable springs and packing rings which are assembled together in the relations illustrated particularly in the exploded view of Fig. 2.

The valve seat member 22 is preferably formed from steel or other suitable material having considerable strength, hardness and wear-resistant properties, as well as having the property of taking a sufficiently high polish upon the actual valve seating surfaces as to provide a fluid-tight seal with the valve members 23 and 24. The valve seat member 22 is preferably formed with a longitudinal bore 26 extending therethrough, the diameter of which is just equal to the diameter of the lower or bearing portion 27 of the sleeve valve 23 so as to support and guide the sleeve valve member 23 longitudinally of the seat member 22. An enlargement 28 is formed in the bore 26, the junction between the bore 26 and its enlargement being formed as a shoulder 29 which constitutes the lower seating surface for the valve members associated with my unit 21.

Immediately above the enlargement 28 is a reduced diameter section 30 of the bore 26, which extends through the upper face of the valve seat member 22 and the junction between the upper face and the bore section 30 constitutes a second valve seating surface 31.

The sleeve valve 23 when in place in the bore 26 has its seating surface 32 engageable with the seating surface 29 on the valve seat member 22.

It will be observed that the valve member 23 has a longitudinal bore 33 extending therethrough, which bore acts as a bearing guide for the reception of an elongated stem 34 formed upon the second valve member 24, communication between the valve member 24 and the valve member 23 being prevented by means of a suitable packing or seal interposed about the stem 34 of the valve member 24. It will be noted that the bore 33 of the valve member 23 has an enlargement 35 at its upper end of sufficient diameter to receive therein an annular valve packing member 36 preferably of V-shaped cross section and which may be formed of any suitable packing material though I prefer to employ Neoprene. The groove 37 of the V-shaped cross section of the packing member 36 permits pressure exerted from above the packing member 36 to spread this packing ring to cause it to snugly engage the stem 34 and the valve member 23 and act as an effective fluid pressure seal. To assist in this action I may provide a spreader or washer 38 about the stem 34 and having a substantially T-shaped cross section, the base of the T extending into the groove 37 while the head of the T may act as a lower seating surface for a valve operating spring 39 which surrounds the stem 34 and has its upper end bearing against a spring seating surface 40 formed upon the valve member 24. The spring 39 therefore acts as a means for normally urging the valve member 23 downwardly upon its seat, requiring exertion of force against the lower end of the valve member 23 in order to raise it from its seat, as will be hereinafter more fully described.

The valve member 24 is formed with an enlarged head 41, a portion of which extends as a radial flange 42 having upon its lower face an angularly disposed valve seating surface 43. When the valve member 24, valve member 23 and valve seat member 22 are in assembled relation, the seating surface 43 is adapted to engage and seat upon the valve seating surface 31 in the valve seat member 32, as will be apparent from an inspection of Fig. 5. The valve member 24 is normally urged downwardly upon the seat 31 by means of a compression spring 44 which surrounds the head 41 of the valve member 24 and seats upon the upper surface of the flange 42 thereof. The upper end of the spring 44 is received within a socket 45 formed in the cap member 25 so that when the cap member is assembled in place upon the valve member 22 the entire valve assembly unit includes the two valve members and the valve seating surface, together with their operating springs held in place and in their assembled relations by means of the cap 25.

It will be noted that the cap 25 is held in place upon the valve seating member 22 by means of the frictional engagement of the outer cylindrical surface 46 thereof within an enlargement 47 at the lower end of the socket 45 of the cap member 25, though it will be understood by those skilled in the art that the cap member may be threaded or otherwise suitably secured upon the seating member 22.

To permit the passage of fluid under pressure into the valve assembly and from the valve assembly through the proper chambers as the valve performs its functions, I provide a number of fluid openings 48 through the side walls of the cap member 25, which when assembled upon the valve seating member provides fluid pressure above the valve member 24 and the valve seating surface 31. Likewise I provide a plurality of fluid openings 48a in the side walls of the valve seat member 22 communicating with the space between the valve seat 31 and the valve seat 29 and I further provide a plurality of fluid openings 49 through the walls of the valve seat member 22 communicating with the interior thereof below the valve seat 29.

By referring to Fig. 5, it will be observed that all that is required is to dispose the fluid openings 48 within the body block 2 in such position as to permit fluid under pressure entering and passing through the passage 9b therein to enter through the fluid openings 48. When the valve member 24 is in seating relation upon its seat 31, such fluid under pressure cannot pass into the valve seating member nor pass therefrom.

Likewise when the valve assembly 21 is in the body block 2, the fluid openings 48a in the valve seat member 22 should be aligned with and communicate with the fluid passage 11b while the fluid openings 49 should be aligned with and communicate with the fluid passage 10b. This is readily accomplished by employing the principles of construction and manufacture described in my copending applications Serial No. 323,376, filed March 11, 1940, and Serial No. 330,752, filed April 20, 1940, as by forming the bore 19, forming the bores for the fluid pasages 9b, 10b, 11b and 12b, and then inserting through the bore 19 a suitable boring tool which will enlarge the bore 19 as indicated at 50 to form an annular chamber surrounding the valve unit 21, the diameter of the enlargement 50 being sufficient to intersect the fluid passage bore 9b at 51 and thus provide for intercommunication between the fluid passage 9b and the interior of the valve assembly 21.

Similarly, the bore 19 may be enlarged as indicated at 52 immediately adjacent the location of the fluid openings 49, such enlargement 52 intersecting the fluid passage 11b as indicated at 53. As hereinbefore described, the lowermost portion 19d of the bore 19 is an enlargement of the bore and this should be so arranged as to intersect the fluid passage 10b as indicated at 54.

With the unit 21 in place within the bore 19b and with various fluid passages 48, 49 and 50, respectively aligned with and communicating with the fluid passages 9b, 11b and 10b, it follows that fluid under pressure entering the passage 9b may, if valve member 24 is lifted from its seat 21, pass through the valve into the enlargement or chamber 28 in the valve seat member 22, and thence to the fluid passage 11b. Also if the valve 24 is open, its seat and valve member 23 is raised from seat 29, fluid from the passage 11b may enter the chamber 28 and thence pass the valve member 23 and exhaust out through the openings 50 and through the exhaust fluid passage 10b.

At this point it should be noted that the valve assembly unit 21 in effect constitutes a removable and replaceable complete valve which may be inserted in or removed from the body block, the body block merely providing a ready mounting therefor and providing the fluid passages which may be permanently connected to the various fluid flow lines 13, 11 and 14, respectively, the unit 21 when inserted in the bore 19 being retained in place therein by means of a plug 55 threaded into the upper enlarged end 19a of the bore 19 as indicated at 56.

In order to effectively seal the valve assembly relative to the various fluid passages 9b, 11b and 10b, I provide, first, a tapered or beveled shoulder 57 on the exterior of the valve seat member 22 which is adapted to rest upon and effectively seal upon the shoulder 58 of the inwardly projecting flange 19c, such seal effectively preventing intercommunication between the fluid passage 11b and the fluid passage 10b except through the interior of the valve seating member and past the valve member 23. Second, I interpose a Neoprene or other packing ring 59 between the valve seat member 22 and the valve assembly cap 25 so that when the assembly is in place and downward pressure is applied upon the cap, the ring 59 will be expanded outwardly to engage and seal against the cylindrical inner surface of the bore 19 between the fluid passages 9b and 11b, preventing intercommunication between these passages except through the valve assembly and past the valve member 24. Third, to prevent escape of the fluid from the passage 9b upwardly around the cap 25, I provide a second Neoprene or other packing ring 60 interposed between the cap and the plug 55, a wear ring 61 of metal being preferably employed to prevent the rotary motion of the plug 55 when screwed into the bore 19 from injuring or destroying the packing ring 60.

Thus it will be observed that merely dropping the valve assembly 21 into the bore 19 and then screwing down the plug 55 will effectively seat the valve assembly upon the seating surface 58 and at the same time expand the packing rings 59 and 60 into complete sealing engagement. However, it will be observed that merely removing the plug 55 will allow the packing rings 59 and 60 to recede from the walls of the bore 19, leaving the valve assembly 21 loose within the bore and permitting its ready removal from the bore merely by grasping a grip head 62 which may be formed upon the upper end of the cap 25.

As hereinbefore stated, the one valve assembly 21 may be effectively employed as a three-way valve for any uses to which such type of valve may be put but in order to effectively adapt my construction to four-way valve use, as for power appliances such as illustrated at 3 in Fig. 1, I provide a duplicate assembly 21a in the bore 20, the construction of the assembly 21a and of the bore 20 being identical with the constructions described for the assembly 21 and the bore 19.

To selectively operate my valve construction, I provide in the body block 12 a suitable operating shaft 63 which preferably extends transversely of the bores 19 and 20 and, as illustrated herein, such shaft 63 may be readily and inexpensively formed from a suitable piece of round bar stock having cam surfaces 64 and 65 turned thereon adjacent the inner end of the shaft while corresponding cam surfaces 66 and 67 may be turned thereon in such position that when the shaft is in place in the body block, the cam surface 65 will be disposed immediately below the downwardly extending stem 34 of the valve member 24 while the surfaces 64 will be disposed immediately below the valve member 23. Similarly, the cam surfaces 66 will be disposed between the valve member 23 and the assembly 21a and the surface 67 will be disposed immediately below the stem of the valve member 24 of the assembly 21a. By disposing the cam surfaces in the correct relation relative to each other, it follows that when the valve is in the position indicated in Fig. 5, which represents the closed position of the valve (that is, all valves closed), the valve members 23 and 24 of assembly 21 will rest upon their respective seats while the valve members 23 and 24 of the assembly 21a will likewise rest upon their respective seats, preventing the flow of power fluid to or from the power apparatus 3.

Figure 6:
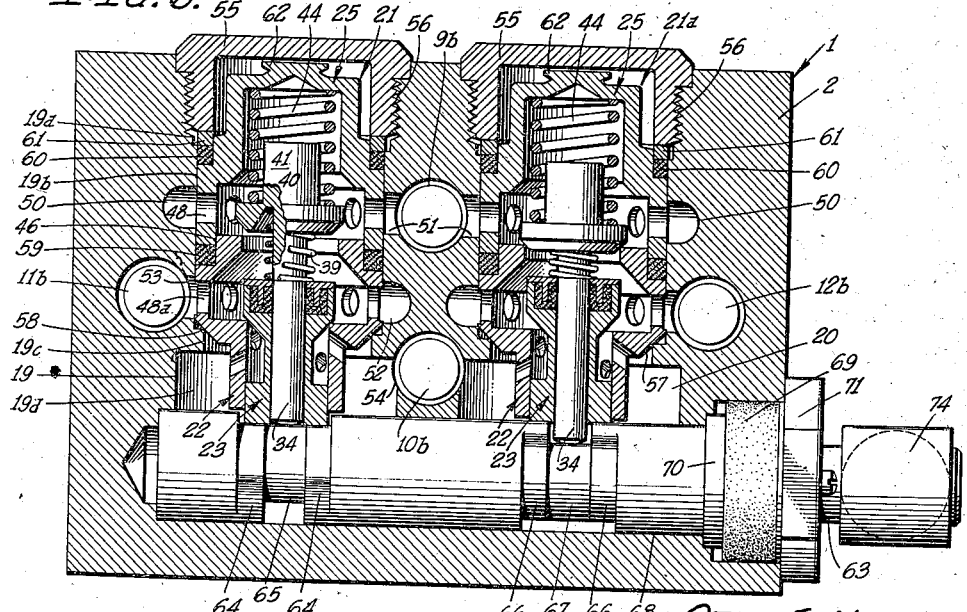
Fig. 6 is a vertical sectional view identical with Fig. 5 but illustrating the position of the valve parts upon operation of the valve handle to move the fluid power mechanism in one direction.

Now when the valve operating shaft 63 is rotating in a clockwise direction, as viewed in Fig. 1, the cam surface 65 should be so arranged as to lift the stem 34 of the valve member 24 of assembly 21, while at the same time the cam surfaces 66 should lift the valve member 23 of the assembly 21a, which positions of the various parts are illustrated in Fig. 6. With the shaft in this position, fluid power from a suitable source entering the passage 9b will pass the valve 24 and, through passage 11b, will be applied to pipe 15 to the right-hand end of the power mechanism 3. At the same time the exhaust fluid from the left-hand side of the piston 5 will pass through pipe 16 into the fluid passage 12b and thence through the valve assembly 21a, past the valve member 23, into the exhaust fluid passage 10b where it may be exhausted to the atmosphere through the pipe 14 or may be returned to the source of pressure supply.

Likewise rotation of the shaft 63 in a counterclockwise direction from the position shown in Figs. 1 and 5 will reverse the positions of the valves 23 and 24 on the assemblies 21 and 21a whereby fluid pressure from the source will pass through the assembly 21a and enter the power apparatus at the left-hand side of the piston 5, while exhaust fluid will return through the pipe 15, fluid passage 11b and past valve 23 of the assembly 21, and so to the exhaust passage 10b.

The shaft 63 may be mounted in the body block in any suitable manner, though I prefer in the interest of economy to merely provide a single bore 68 in the body block 2 of suitable diameter to just permit the insertion and ready rotation therein of the shaft 63, the outer end of the bore 68 being suitably packed by means of a cup-like annular packing member 69 which may be held in an expanded position by means of a cylindrical washer or sleeve 70, the packing 69 being held in place by means of a cover plate 71 which is preferably provided with an internal shoulder 72 which will engage a shoulder 73 formed upon the shaft in place within the bore 68. A suitable handle 74 may be provided upon the shaft 63.

It will be observed therefore that with my new valve construction the active valve parts may be readily manufactured and assembled as units separate from the body so that the body may be permanently connected to the flow lines and repairs to the valve may be made merely by removing the plug, lifting out the valve assembly and replacing the same with a new or reconditioned assembly without delay and without requiring the labor of repairing the present valves which require removal from their installation when repairs or replacements are to be made.

In order to facilitate the ready removal of the valve nits after they have been in place within the valve body, I prefer to make the packing rings 59 and 60 substantially self-releasing as by forming them with a wall thickness less than the width of the shoulders upon which they rest and with a wall length sufficiently great that when they are compressed by screwing down on the plugs 55 they will be distorted into tight sealing relation with the walls of the bore 19. Thus when the plugs 55 are removed, the natural resilience of the packing material will cause them to pull away from the walls of the bore 19. I find also that this retraction of the packing rings may be facilitated by forming them with an internal diameter somewhat less than the external diameter of the valve seat member and cap member upon which they are mounted so that when they are in place upon these members they are under circumferential tension.

Again it will be observed that my novel use of a body block with the various pipe connections permanently coupled thereto and with merely a relatively smooth-walled bore communicating with the fluid passages and the pipe connections permits adaptation of my valve to either single valve use, as by employing a seat member 22 with a single valve member 23 or 24 assembled therewith, or the same essential structure may be employed with a double valve assembly including both the valve members 23 and 24 in a single unit for three-way operation, or by employing two or more of these assemblies in a single body block, four-way or additional multiple way valve adaptations may be provided.

While I have shown and described the preferred embodiment of my invention, I do not desire to be limited to any of the details of construction shown or described herein, except as defined in the appended claim.

I claim:

In a fluid control valve, a body member, a valve receiving bore in said body member, three fluid passages in said body member communicating with said bore at three points spaced respectively along said bore, a valve assembly in said bore including a cylindrical valve seat member, a pair of valve seats formed in said seat member in spaced relation along said member, a sleeve valve member cooperating with one of said seats, a poppet valve member cooperating with the other of said seats and having a stem thereon extending through said sleeve member and exteriorly of said seat member and a cap member on said seat member and enclosing said valve member, fluid passages formed in said cap member and said seat member communicating with the interior of said assembly respectively above the poppet valve, between the poppet valve and sleeve valve and below the sleeve valve, said fluid openings being disposed along said assembly in such spaced relation as to communicate respectively with the three fluid passages in said body member, and a plurality of seals associated with said valve assembly and said bore to seal said valve assembly against the passage of fluid exteriorly of said valve assembly except through the valves of said assembly.

OTIS C. MARTIN.